United States Patent [19]
Sherman

[11] Patent Number: 5,511,639
[45] Date of Patent: Apr. 30, 1996

[54] CONTROL FOR POWER TRANSMISSION TORQUE TRANSMITTING MEMBERS

[75] Inventor: James F. Sherman, Brighton, Mich.

[73] Assignee: General Motors Corporation, Detroit, Mich.

[21] Appl. No.: 351,846

[22] Filed: Dec. 8, 1994

[51] Int. Cl.$^6$ .................................................. F16D 51/00
[52] U.S. Cl. ...................... 188/77 R; 192/17 R; 188/259
[58] Field of Search .................................. 188/77 R, 249, 188/259, 250 H, 71.2, 77 W; 475/116; 192/17 R, 17 A

[56] References Cited

U.S. PATENT DOCUMENTS

| 4,098,378 | 7/1978 | Helmer | 192/17 A |
|---|---|---|---|
| 4,224,837 | 9/1980 | Croswhite . | |
| 4,360,092 | 11/1982 | Müller et al. | 192/17 A |
| 4,604,914 | 8/1986 | Fisher | 188/77 R |
| 4,860,860 | 8/1989 | Furuya et al. | 188/77 R |
| 4,930,373 | 6/1990 | Nakawaki et al. | 188/77 R X |
| 5,086,887 | 2/1992 | Van Maane et al. | 188/77 R |
| 5,328,008 | 7/1994 | Sano | 188/77 R |

*Primary Examiner*—Douglas C. Butler
*Attorney, Agent, or Firm*—Donald F. Scherer

[57] ABSTRACT

A transmission control for a multi-speed planetary gear arrangement is responsive to thrust forces generated by the band at the band drum support controlled by an on-coming friction device during a ratio interchange to generate a control signal. The control signal is used to begin the disengagement process of the off-going friction device.

2 Claims, 3 Drawing Sheets

CONTROL FOR POWER TRANSMISSION TORQUE TRANSMITTING MEMBERS

TECHNICAL FIELD

This invention relates to transmission control and transmission brake band arrangements, and more particularly, to transmission controls effective to initiate the disengagement of band brakes during a ratio interchange.

BACKGROUND OF THE INVENTION

Power transmissions having planetary gear arrangements include selectively engageable friction devices that are operable to provide a number of gear ratios, thereby providing more efficient employment of a prime mover having a limited operating speed range. An electro-hydraulic system is utilized to control the interchange of ratios in the planetary gearing.

The ratios are interchanged by engaging one friction device, such as a clutch or brake, and disengaging another friction device, such as a clutch or brake. During a torque phase portion of the interchange period, both friction devices are at least partially engaged. The off-going device is held fully engaged until the on-coming device has a predetermined torque capacity.

The point at which the off-going device should begin to release can be difficult to determine. Some prior art control systems have used the torque level at the output shaft as exemplified by stress therein.

Other systems have used a "washout" shift, wherein a band brake is the off-going device and the servo piston thereof has an area available to be pressurized, by the fluid feed to the on-coming device, to enforce disengagement of the brake.

Still other systems use a time phased control which is adjusted by the harshness or softness of the previous shift for a given set of input parameters. The most popular method of controlling upshift timing is the use of a one-way torque transmitting device, either alone or in series, with a friction device.

SUMMARY OF THE INVENTION

The present invention includes a selectively engageable friction device which utilizes a control fluid that senses a reduction in the reaction force of the friction device (such as a brake band) to initiate the disengagement of the friction device.

During engagement of a brake band, a thrust force is generated which reflects the transmission of torque to the housing. The thrust force is transmitted via the band anchor, band and band drum to be absorbed by bushings supporting the drum. By directing a control fluid feed to the drum support under the bushing, the thrust level and therefore torque level can be sensed and used as a control signal during a ratio interchange.

When the thrust path through the drum support is established by a fluid operated torque transmitting device, such as a selectively engageable friction clutch or brake, the transmission of torque can be controlled during the ratio interchange.

It is therefore an object of this invention to provide an improved power transmission and control, wherein, during a ratio interchange, the off-going friction device is controlled in response to the torque capacity of the on-coming friction device.

It is another object of this invention to provide an improved multi-speed transmission and control, wherein a pair of fluid operated friction devices are interchanged to complete a ratio interchange in the transmission, and wherein the off-going friction device has a force responsive control signal device actuated by an on-coming friction device, to effectively initiate the disengagement of the off-going friction device when the torque capacity of the on-coming friction device is at or above a predetermined level.

These and other objects and advantages of the present invention will be more readily apparent from the following description and drawings.

DESCRIPTION OF AN EXEMPLARY EMBODIMENT

Figure 1:
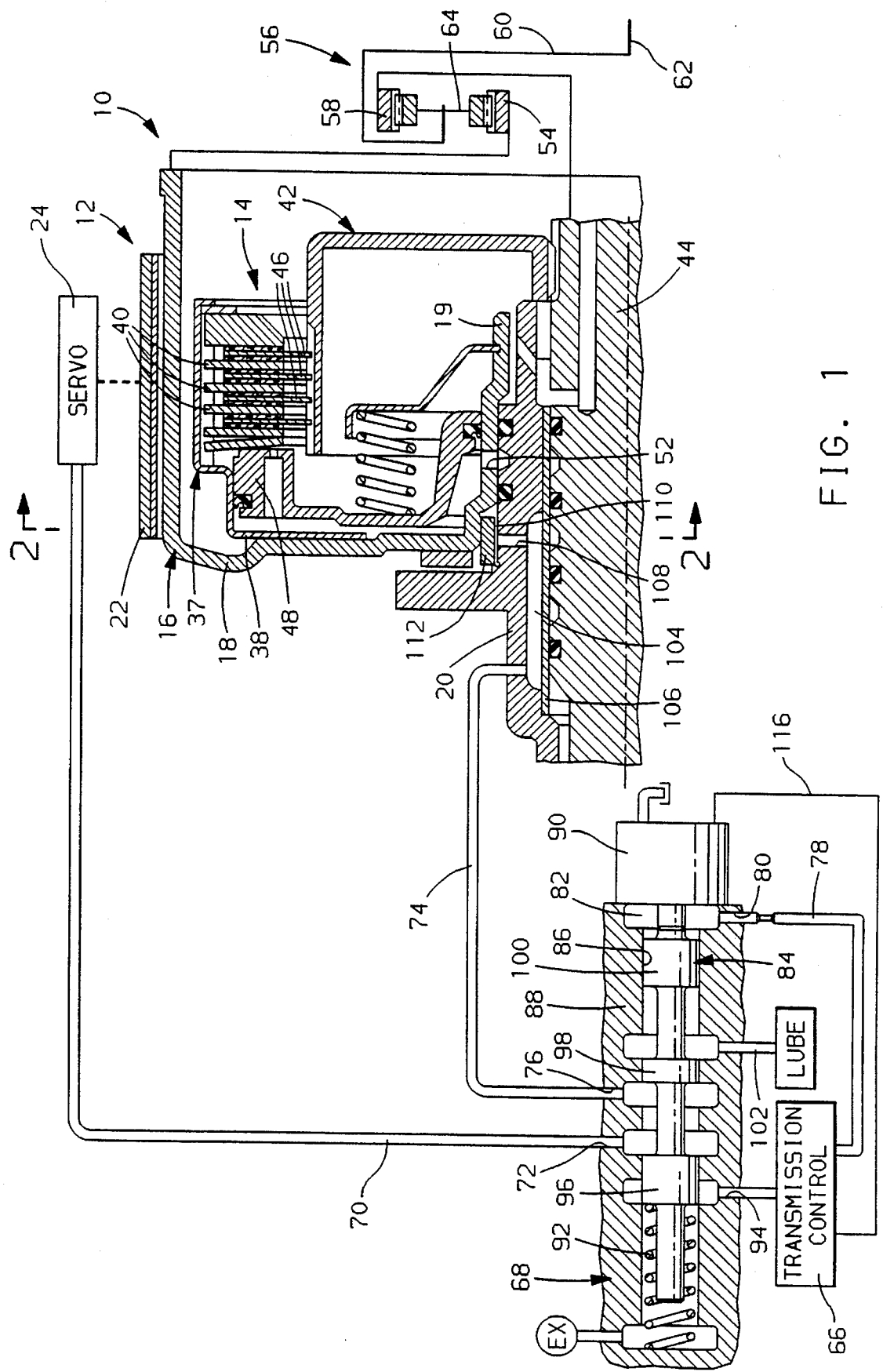
FIG. 1 is a partial section and diagrammatic view of a band and clutch assembly servo apply mechanism and controls.

Referring to the drawings, there is seen a clutch and brake assembly, generally designated 10, which includes a brake assembly 12 and a clutch assembly 14. The brake assembly 12 includes a drum 16 having an annular wall 18 rotatably journaled by a hub 19 and a stator shaft 20. The brake assembly 12 further includes a brake band 22, which surrounds the drum 16, and is operated in an engagement and disengagement condition by a conventional fluid servo 24.

Figure 2:
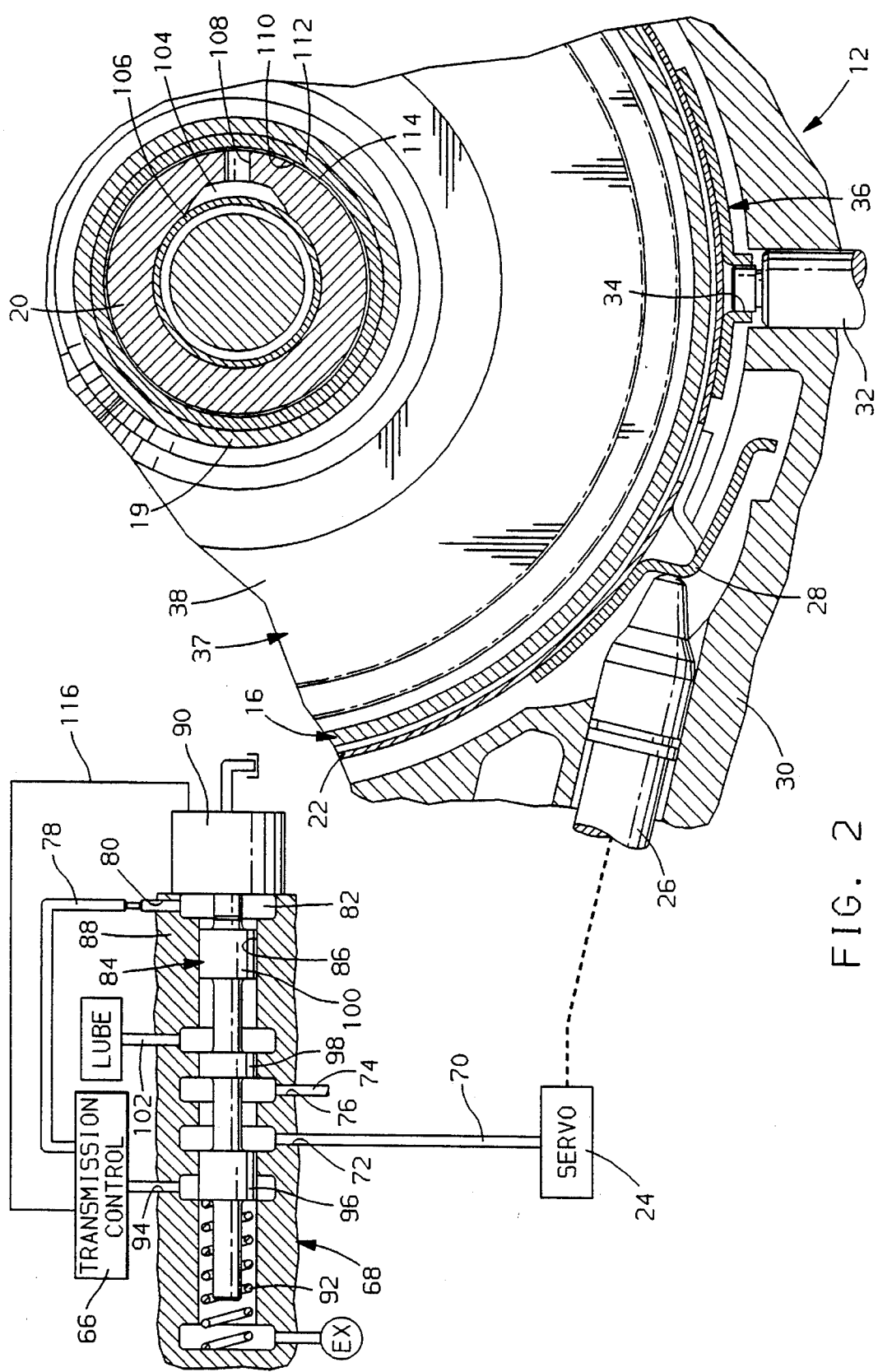
FIG. 2 is a section taken along line 2—2 of FIG. 1 depicting one mode of operation.
Figure 3:
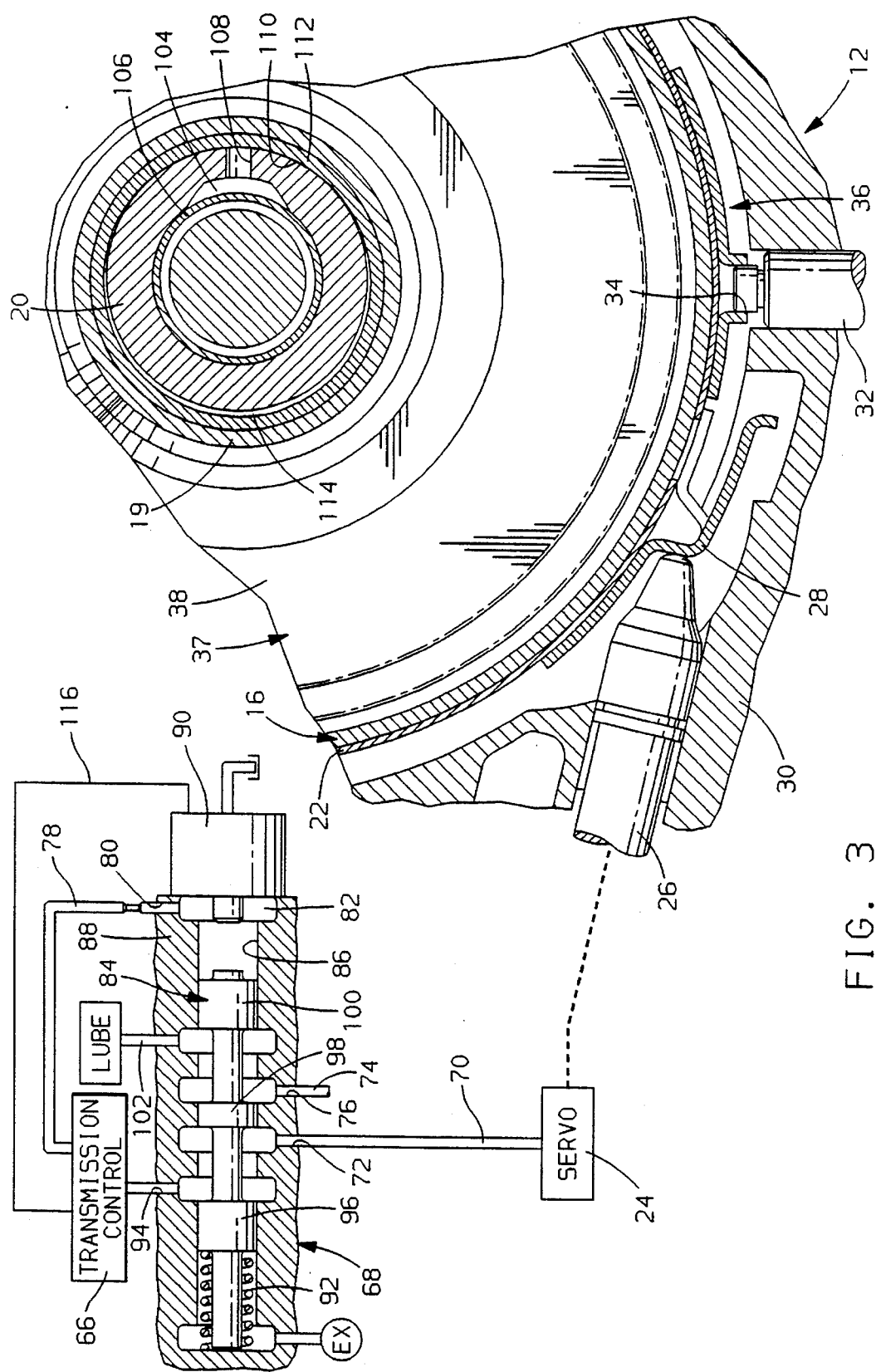
FIG. 3 is a view similar to FIG. 2 depicting another mode of operation.

As best seen in FIGS. 2 and 3, the servo 24 includes a servo rod 26 which abuts an apply strap 28 on the brake band 22. The band 22 is grounded to a transmission housing 30 by an anchor pin 32 which is engaged in an opening 34 on an anchor strap 36. When the servo rod 26 is extended by fluid pressure in the servo 24, the band 22 will be caused to wrap down on the brake drum 16, thereby grounding the brake drum and causing the brake drum 16 to come to a halt.

The clutch assembly 14 includes a clutch housing 37, which is essentially an annular housing having a wall 38 secured to the annular wall 18 of the brake assembly 12, a plurality of friction plates 40 splined to the housing 37, an inner hub 42 secured to a shaft member 44, a plurality of friction plates 46 splined to the hub 42 and interspersed with the plates 40, and an apply piston 48 slidably disposed in the housing 37 at an outer diameter thereof and on the hub 19 at an inner periphery. Fluid pressure is supplied between the piston 48 and the annular wall 18 through a clutch feed passage 52, which is supplied with fluid pressure in a conventional manner.

Brake drum 16 is secured to a sun gear 54, which is a component in a planetary gear arrangement 56. The planetary gear arrangement 56 also includes a ring gear 58 secured with the shaft 44 and a carrier assembly 60 providing an output shaft 62. The carrier assembly 60 includes a plurality of pinion gears 64 which are meshingly engaged with the sun gear 54 and the ring gear 58. When the shaft 44 is rotated and the brake assembly 12 is engaged, the sun gear 54 will be stationary and the ring gear 58 will be rotated at the speed of the shaft 44 resulting in a reduced drive to the carrier 60 and shaft 62. When the clutch assembly 14 is engaged and the brake assembly 12 is disengaged, the planetary gear set 56 will rotate as a single unit, such that the speed of shafts 44 and 62 will be identical.

From the underdrive condition, with the brake band 12 engaged, to the direct drive or 1:1 ratio condition, with the clutch assembly 14 engaged, there is a ratio change during which the clutch piston is pressurized to enforce engagement of the clutch while the servo 24 of the brake assembly 12 is depressurized to permit the ratio change.

This ratio change is controlled by a conventional transmission control 66 which includes both hydraulic and electronic devices operating in a well known manner to provide the ratio interchange as desired by the sampling of various vehicle parameters, such as engine speed, vehicle speed and throttle setting. The transmission control 66 includes a control valve 68, which has a brake control passage 70 connected with an output port 72, an exhaust passage 74 connected to an exhaust control port 76, a control passage 78 connected with a control port 80 and a control chamber 82.

The control valve 68 further includes a spool valve 84 slidably disposed in a valve bore 86 formed in a valve body 88, which is a part of the transmission control 66. The spool valve 84 is urged toward a solenoid control member 90 by a compression spring 92. The solenoid 90 and spring 92 are effective to control the spool valve to be located in positions between a brake "off" position, as shown in FIGS. 1 and 2, and a brake "on" position, as shown in FIG. 3.

The transmission control 66 provides fluid pressure through an inlet port 94 to the valve bore 86, wherein the brake "off" or brake disengage position is blocked by a land 96 of the spool valve 84. With the spool valve 84 in this position, the passages 70 and 74 are connected through the valve bore 86 between the land 96 and a land 98.

A further land 100 is also slidably engaged with the valve bore 86 and is effective to close the chamber 82 from the remainder of the valve bore 86. A lube passage 102 is also connected with the valve bore 86 and in the brake disengage position, shown in FIGS. 1 and 2, is connected between the valve lands 98 and 100. When it is desirable to engage the brake 12 to provide an underdrive in the planetary gear set 56, the solenoid 90 is energized thereby causing the chamber 82 to be pressurized which will result in the spool valve 84 being moved leftward, as seen in FIG. 3, against the spring 92. In this condition, the inlet port 94 is open to the passage 70 between the lands 96 and 98, such that high fluid pressure will be directed to the conventional servo 24 causing the rod 26 to be extended thereby enforcing engagement of the brake band 22 with the drum 16.

The passage 74 is connected at the stator shaft 20 with an exhaust control recess 104 formed in the stator shaft 20 and closed by a sleeve 106. The exhaust control recess 104 is connected by a radial passage 108 to an inner periphery 110 of a bushing 112. The bushing 112 is designed to provide rotary support on the stator shaft 20 for the clutch and brake assembly 10. When the clutch assembly 14 is engaged, the drum 16 will rotate about the stator shaft 20, such that a clearance 114 is present between the bushing 112 and the stator shaft 20. This provides a fluid connection between the recess 104 and an exhaust path or lubrication system (not shown) which will reduce the pressure in fluid passage 74.

When the brake assembly 12 is engaged, the reaction torque imposed by the anchor pin 32 will cause the drum 16 to be moved, such that the clearance 114 between the stator shaft 20 and bushing 112 will be completely open opposite the passage 108 while the bushing 112 is disposed in abutment with the outer periphery of the stator shaft 20 resulting in closure of the passage 108.

Therefore, when the brake assembly 12 has been energized to engage by the valve 68, the exhausting of passage 74 is permitted by the bushing 112 sealing the passage 108. Consequently, when the interchange between clutch assembly 14 and brake assembly 12 is first activated, the brake band 22 remains engaged even though the control valve 68 will be positioned to the disengage condition as shown in FIGS. 1 and 2. However, as the clutch assembly 14 continues to increase in torque capacity, the torque capacity of the brake assembly 12 will decrease such that the load on the anchor pin 32 will also decrease resulting in the brake drum 16 centering itself on the stator shaft 20. When this occurs, the passage 74 will be open for exhaust, such that the servo 24 will be exhausted and the brake assembly 12 will be disengaged. Thus, it will be apparent to those skilled in the art that the disengagement of the brake assembly 12 will be commensurate with the torque capacity of the on-coming friction device, which in this instance, is the clutch assembly 14. This is quite similar to a one-way device which also responds to the capacity of the on-coming friction member to release the previously energized brake member.

In many transmissions, the brake assembly 12 might be utilized to establish a second gear ratio while the clutch assembly 14 is utilized to establish a third gear ratio. Thus, the 2–3 interchange is controlled, as described above, by the control valve 68. Under this conditions, the transmission control 66 will signal that a 2–3 shift should occur and will energize the solenoid 90 through an electrical connection 116. The control 66 can also continue to supply fluid pressure at the passage 94.

The de-energization of the solenoid 90 will result in the spool valve 84 being positioned as shown in FIGS. 1 and 2, such that the brake band can be disengaged while the clutch is engaged. Following this interchange, the transmission control can then be signaled to deenergize or depressurize the passage of port 94 and simultaneously energize the solenoid 90 such that the transmission will be ready for a 3–2 downshift when requested by the transmission control 66. Also, in some transmissions, the brake assembly 12 may also be utilized for a higher ratio, such as an overdrive condition, in which case the valve 68 is conditioned to permit the brake assembly to be energized when the overdrive condition is requested.

It should be apparent at this time to those skilled in the art that the brake disengagement is closer related to the torque capacity of the on-coming friction device, such that during the torque phase of a ratio interchange, the brake band responds similar to that of a one-way resulting in a smooth interchange which will be virtually imperceptible to the operator.

The embodiments of the invention in which an exclusive property or privilege is claimed are defined as follows:

1. In combination, a transmission and control comprising:

a brake drum having an inner hub and bushing;

a shaft supporting the inner hub and bushing;

a brake band surrounding said drum and including selectively pressurized servo means for engaging the brake band with said drum for establishing a reaction torque thereon, said brake drum being urged to move laterally relative to said shaft when said servo means is pressurized and the reaction torque is imposed on said drum;

passage means for conducting fluid including an opening in said shaft closed by said bushing at a predetermined reaction torque level on said brake drum; and valve means including a valve spool movable to first and second positions for controlling fluid flow to and from said servo means having a connection with said passage means for exhausting said servo means through said valve means and said passage means when said valve spool is in the first position and the reaction torque is below the predetermined level.

2. In combination, a transmission and control comprising:

a brake drum;

hub and bushing means for rotatably supporting the brake drum;

a shaft supporting the hub and bushing means;

a brake band surrounding said drum and including selectively pressurized servo means for engaging the brake band with said drum for establishing a reaction torque thereon, said brake drum and said hub and bushing means being urged to move laterally relative to said shaft when said servo means is pressurized and the reaction torque is imposed on said drum;

passage means for conducting fluid including an opening in said shaft closed by said hub and bushing means at a predetermined reaction torque level on said brake drum: and valve means including a valve spool movable to predetermined positions for controlling fluid flow to and from said servo means having a connection with said passage means for exhausting said servo means through said valve means and said passage means when said valve spool is in one predetermined position and the reaction torque is below the predetermined level.

* * * * *